Nov. 3, 1925.
J. S. DA COSTA
GRAVITY CONVEYER CHUTE
Filed Oct. 31, 1924
1,560,466
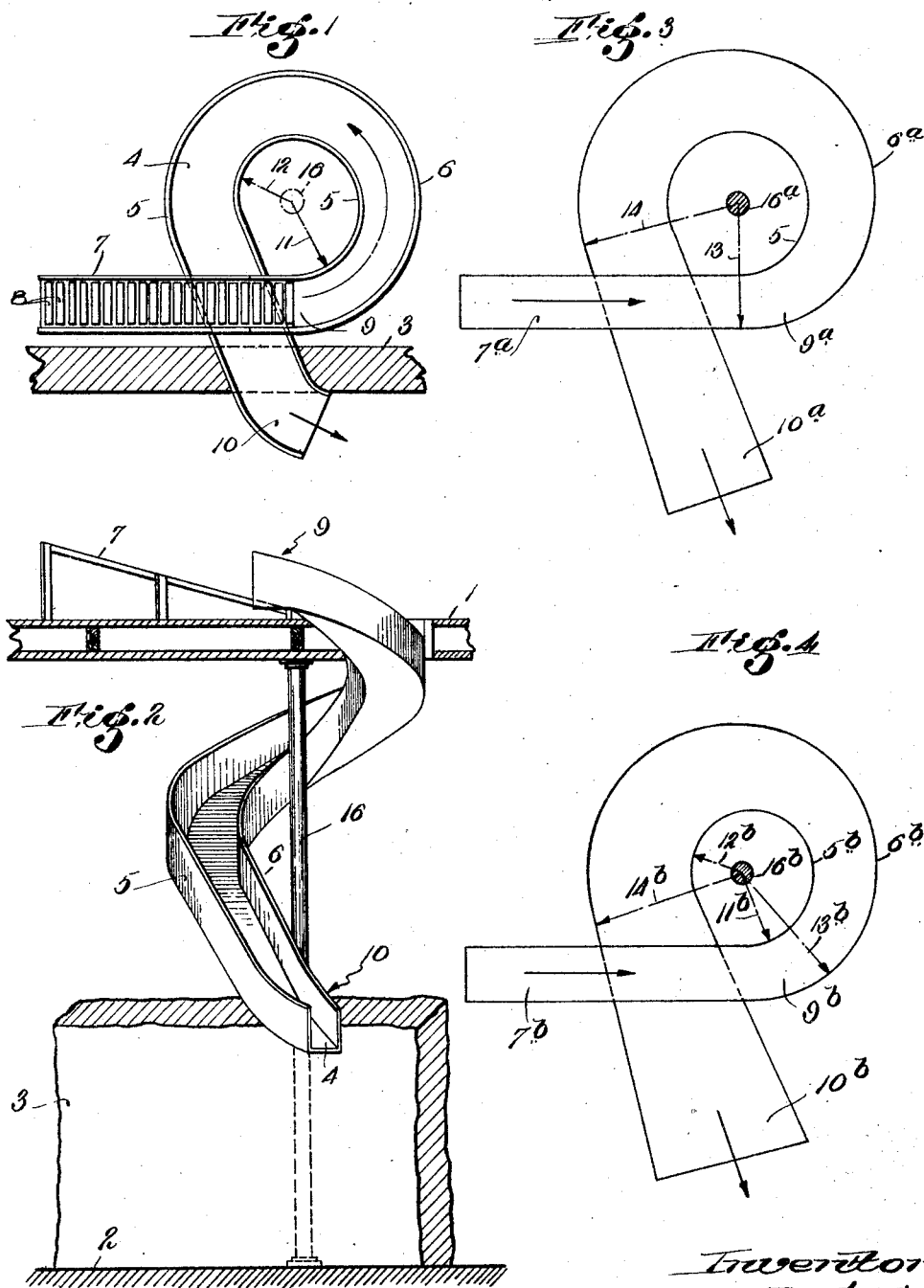
Inventor
James S. DaCosta, Patented Nov. 3, 1925.

1,560,466

UNITED STATES PATENT OFFICE.

JAMES S. DA COSTA, OF MERCHANTVILLE, NEW JERSEY, ASSIGNOR TO THE LAMSON COMPANY, OF BOSTON, MASSACHUSETTS, A CORPORATION OF NEW JERSEY.

GRAVITY CONVEYER CHUTE.

Application filed October 31, 1924. Serial No. 747,000.

*To all whom it may concern:*

Be it known that I, JAMES S. DA COSTA, citizen of the United States of America, and resident of Merchantville, in the county of Camden and State of New Jersey, have invented new and useful Improvements in Gravity Conveyer Chutes, of which the following is a specification.

This invention pertains to gravity conveyer chutes of the type commonly employed for transferring packages, articles of merchandise, etc. from upper to lower floors of buildings, and has for its object the provision of a chute of such construction as substantially to prevent the packages or articles from becoming jammed between the sides of the chute and clogging the chute under normal conditions of use.

When chutes are employed for transferring packages or articles of a more or less resilient or compressible character, for example bundles of newspapers, magazines, etc., it is found that if the articles are not removed from the delivery end of the chute at once after their arrival the succeeding articles tend to jam and clog the chute so that even when the accumulation at the end of the chute is removed the jam remains unbroken and much difficulty and unnecessary delay is experienced in clearing the chute before its operation may be resumed.

In the accompanying drawings a preferred embodiment of the present invention is illustrated by way of example,—

Fig. 1 being a plan view partly in section showing a simple form of spiral chute embodying the invention;

Fig. 2 is an elevation partly in section showing the chute of Fig. 1;

Fig. 3 is a diagrammatic plan view showing a modification of the structure of Fig. 1; and Fig. 4 is a view similar to Fig. 3 but illustrating a further modification.

Referring to the drawings and particularly to Figs. 1 and 2 the numeral 1 indicates one of the upper floors of a building and the numeral 2 a floor below it, while 3 designates a partition wall through which the chute may pass if desired.

The improved chute comprises the inclined floor 4 and the spaced side walls 5 and 6. These walls may be vertical as shown or if desired flared outwardly and under some circumstances the top of the chute may be closed.

As shown in the drawings the upper end of the chute is furnished with a feeding device consisting of an inclined support 7 provided with antifriction rolls 8 upon which the articles may be placed and along which they slide into the upper end of the chute. The lower end of the chute is preferably spaced above the floor a suitable distance to permit a truck or other conveyance to be placed beneath it so as to receive the articles delivered by the chute but it is to be understood that the present invention is not concerned with the specific details of the location of the ends of the chute or the auxiliary devices which may be furnished for feeding articles to or removing them from the chute.

In the example shown in Figs. 1 and 2 the chute is of spiral substantially helical form and is coiled about a vertical axis coincident if desired with the axis of a post or column 16. While but one complete coil is illustrated the invention is equally applicable to chutes comprising a plurality of turns or spirals.

In accordance with the present invention the guide channel defined by the floor 4 and the side walls 5 and 6 is of increasing width from the upper end 9 of the chute toward its lower end 10.

The increase in width in the guide channel is produced by causing the inner wall 5 of the chute gradually to approach the vertical axis of the chute as the chute descends from its upper toward its lower end, while at the same time its outer wall 6 is maintained concentric with the upper axis of the chute. This construction is illustrated in Fig. 1 where the line 11 indicates the spacing of the wall 5 from the axis of the post adjacent to the outer end of the chute while the line 12 indicates the lesser spacing of such inner wall as it approaches the lower end of the chute.

In a chute having the general dimensions shown in Figs. 1 and 2 the increase in width for best results should be approximately 60%, although it is to be understood that this width may be varied in accordance with circumstances, for example in accordance with variations in the length and diameter of the helical coils of the chute as well as the character of the articles to be conveyed.

When the chute is constructed in the manner above described so that its walls gradually recede from each other toward its lower end, it is found that even though the diameter of the spiral coil be relatively small and its pitch steep, and even though the articles to be conveyed are relatively heavy but easily compressed or of spongy character, such articles continue to flow in an uninterrupted stream so long as they are freely delivered from the end of the chute, and that there is no tendency of the articles to jam even when the lower end of the chute is temporarily blocked.

In Fig. 3 a slight modification of the structure is diagrammatically illustrated. The numeral 7ª indicates the feeder device and the numerals 9ª and 10ª the upper and lower ends of the chute proper. The post or axis of the chute is indicated at 16ª and in this instance the inner wall 5 of the chute is concentric with such axis. The outer wall 6 of the chute gradually recedes from the axis as it descends, as illustrated by the lines 13 and 14, comparison of which indicates the increase in distance between the axis and outer wall 6 as the latter descends from the top to the bottom of the chute.

In Fig. 4 a further modification is illustrated in which the numeral 7ᵇ indicates the feeder end of the chute,—the numerals 9ᵇ and 10ᵇ the upper and lower ends of the chute proper, respectively, and 16ᵇ the central post or axis. In this instance the inner wall 5ᵇ of the chute is spaced a maximum distance 11ᵇ from the axis at a point adjacent to the upper end of the chute and gradually approaches the axis as indicated by the length of line 12ᵇ. On the other hand the outer wall 6ᵇ is at a minimum distance 13ᵇ from the axis at a point adjacent to its upper end and gradually recedes from the axis toward its lower end as indicated by the line 14ᵇ. The walls of the chute thus diverge from each other respectively from the upper toward the lower end of the chute.

The several forms of construction above described provide the necessary increase in width in the convolute guide channel along which the articles pass and either type of construction may be employed as may be most convenient in practice although the arrangement shown in Fig. 1 is preferred.

I claim:

1. A spiral conveyer chute comprising spaced side walls arranged to define an inclined convolute guide channel coiled about a vertical axis, one of said side walls gradually approaching said axis as it descends.

2. A spiral conveyer chute comprising spaced side walls defining an inclined channel extending in a convolute path about a vertical axis, one of said walls approaching said axis and the other diverging therefrom from the top to the bottom of the chute.

Signed by me at Philadelphia, Pennsylvania, this 28th day of October, 1924.

JAMES S. DA COSTA.